INVENTOR.
Dale L. Dunn
BY
C. R. Meland
ATTORNEY

United States Patent Office 3,543,043
Patented Nov. 24, 1970

3,543,043
BATTERY PROTECTION SYSTEM
Dale L. Dunn, Indianapolis, Ind., assignor to General Motors Corporation, Detroit, Mich., a corporation of Delaware
Filed Nov. 4, 1968, Ser. No. 773,122
Int. Cl. H02j 1/10
U.S. Cl. 307—18
6 Claims

ABSTRACT OF THE DISCLOSURE

An electrical control system for preventing the over charge or over discharge of storage batteries and particularly batteries of the nickel-cadmium type. The control system includes a transistor connected between the battery and an electrical load. The battery voltage is sensed by a circuit connected with the transistor which includes a Zener diode and when battery terminal voltage drops below a predetermined value the transistor is biased non-conductive to disconnect the battery and the load. The battery is protected from over charge by a control circuit which connects an electrical load in shunt with the source of charging current and the battery whenever the terminal voltage of the battery reaches a predetermined value. A system is provided for controlling power supply systems of the type that include a plurality of batteries and a plurality of electrical loads and in this system a single Zener diode is utilized as a voltage sensing element to provide protection against over charge and protection against over discharge by controlling the conduction of a plurality of transistors.

---

This invention relates to protection systems for batteries and particularly batteries of the nickel-cadmium type which are operative to prevent over charging of a battery and also to prevent the over discharge of the battery.

A considerable amount of electronic test equipment is presently being powered by rechargable nickel-cadmium batteries and under normal use these batteries are capable of providing a number of charge and discharge cycles. It is known however that the effective life of these batteries is shortened considerably if the batteries are either over charged or over discharged during use of the test equipment.

In regard to the over discharge of the battery the test instruments are provided with switches for disconnecting the battery and the electrical load but it sometimes happens that these switches are inadvertently left in a closed position after the instrument has been used with the result that the battery can be over discharged. It is also important, in order to extend the life of the battery, to prevent the battery or bateries from being over charged since this is also detrimental to the expected life of the battery.

It accordingly is one of the objects ot this invention to provide a control system which is capable of preventing the over discharge and over charge of storage batteries.

Another object of this invention is to provide a control system for preventing over charge or over discharge of a battery which utilizes one or more transistors that control the discharge of the battery in response to the terminal voltage of the battery. In carrying this object forward a Zener diode senses the terminal voltage of the battery and is operative to bias a transistor that connects the battery and load to a nonconductive condition when battery voltage drops below a predetermined value. The battery is prevented from over charge by utilizing a transistor that electrically connects a load in parallel with the battery and charging source to shunt current away from the battery when the battery attains a predetermined voltage.

Another object of this invention is to provide a control system for controlling the charge and discharge of a plurality of batteries that supply more than one electrical load and a system wherein transistors and a Zener diode are utilized to control the conduction of transistors connecting the batteries and loads and further to a system where a charge limit transistor shunts the source of direct charging current and battery when the battery attains a predetermined charge. In carrying this object forward only one Zener diode is required for controlling the charge and discharge systems.

Figure 1:
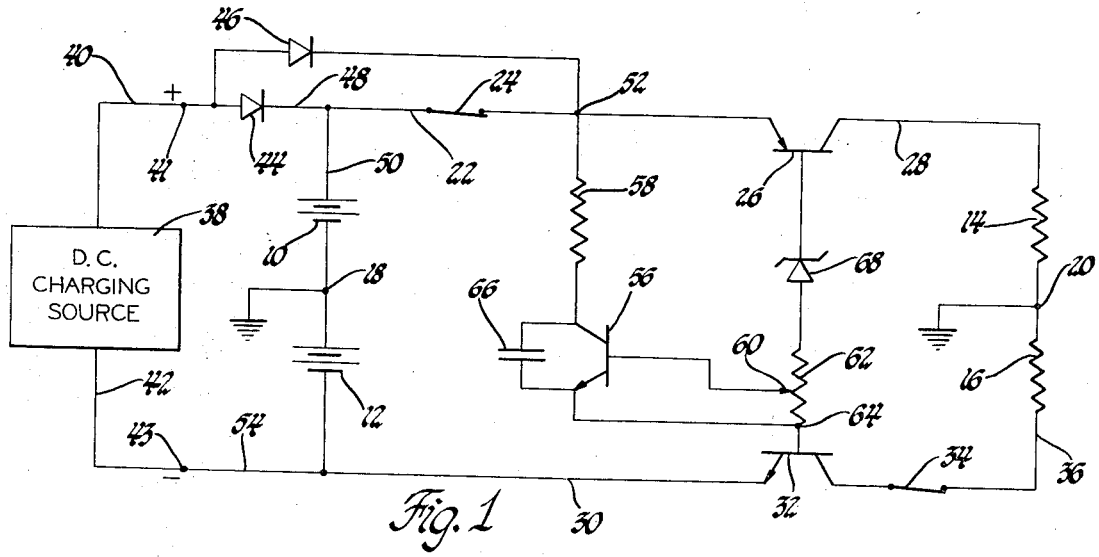
FIG. 1 is a schematic circuit diagram of a battery protection system made in accordance with this invention where the system has a plurality of batteries and a plurality of electrical loads.

Referring now to the drawings and more particularly to FIG. 1, a battery protection system is illustrated for use with a power supply system that has two batteries 10 and 12 and two electrical loads 14 and 16. The batteries 10 and 12 may be nickel-cadmium batteries having a 12 volt terminal voltage and the electrical loads 14 and 16 can be loads found on an electronic test instrument. The batteries 10 and 12 are connected to a grounded junction 18 while the electrical loads 14 and 16 are connected to grounded junction 20.

The positive side of the battery 10 is connected with a conductor 22 which in turn is connected in series with a manually operable switch 24, the emitter-collector circuit of a PNP transistor 26 and a conductor 28. The negative side of battery 12 is connected with a conductor 30 which is connected in series with the collector-emitter circuit of a NPN transistor 32, a manually operable switch 34 and conductor 36. It will be appreciated that when the transistors 26 and 32 are biased conductive and when switches 24 and 34 are closed the batteries 10 and 12 will feed the electrical loads 14 and 16. As will be more fully described hereinafter the transistors 26 and 32 will be biased nonconductive whenever the terminal voltage of the batteries drops below a predetermined value to in effect disconnect the loads and the batteries.

The system of FIG. 1 includes a direct current battery charging source designated by reference numeral 38 having a positive power supply conductor 40 and a negative power supply conductor 42 connected respectively with terminals 41 and 43. The source of battery charging current 38 can take a wide variety of forms and may for example include a step down transformer the secondary winding of which is connected with a rectifying circuit to provide a rectified direct current output which is supplied to conductors 40 and 42. The primary winding of the transformer in such an arrangement is connected with any available 115 volt AC outlet.

The terminal 41 of the source of charging current 38 is connected to one side of diodes 44 and 46. The opposite side of diode 44 is connected with conductor 48 and this conductor is connected with a conductor 50 that in turn is connected with the positive side of battery 10. The cathode of diode 46 is connected with a junction 52 which in turn is connected with the emitter of transistor 26.

In the system of FIG 1, when the direct current source 38 has an output current, for example when its AC input is connected to an AC outlet, charging current will be supplied to batteries 10 and 12 in series. The circuit for charging current can be traced from conductor 40, through terminal 41, through diode 44, through conductors 48 and 50, through the series connected batteries 10 and 12 and then back to the negative power supply conductor 42 through conductor 54. It will be observed that the batteries are charged with the system of FIG. 1 whenever the source of direct current is supplying charging current since there are no switches between the source of direct current 38 and the batteries 10 and 12.

The system of FIG. 1 has an NPN transistor 56 which is used at times to limit the charging of batteries 10 and 12. The collector of transistor 56 is connected with junction 52 through a resistor 58 which may for example be a 2200 ohm resistor where the batteries have a 12 volt rating. The base of transistor 56 is connected to an adjustable tap 60 of an adjustable resistor 62. The emitter of transistor 56 is connected with junction 64 and to the base of transistor 32. A capacitor 66 is connected across the collector and emitter of transistor 56. A voltage responsive control means which takes the form of a Zener diode 68 connects the base of transistor 26 with one side of resistor 62. This Zener diode may have a break down voltage of 20 volts where the batteries 10 and 12 are 12 volt batteries.

The operation of the system shown in FIG. 1 will now be described. Assuming that the switches 24 and 34 are closed and that the source of direct current 38 is deenergized the batteries 10 and 12 will supply the electrical loads 14 and 16. The batteries 10 and 12 will continue to supply current to the electrical loads 14 and 16 until the potential of these batteries drops below a predetermined value and this value is selected to prevent over discharge of the batteries. As long the voltage appearing between conductors 22 and 30 is above a predetermined value the transistors 26 and 32 are biased conductive to maintain a connection between the batteries and the electrical loads. Thus, when the voltage between conductors 22 and 30 is above a desired value this voltage is sufficient to break down the emitter-base circuit of transistor 26, the Zener diode 68 and the base-emitter circuit of transistor 32 with the result that transistors 26 and 32 are biased conductive.

When the combined voltage of batteries 10 and 12 drops below a predetermined value the Zener diode 68 will block current flow in the emitter base circuit of transistor 26 and the base-emitter circuit of transistor 32 with the result that transistors 26 and 32 become biased nonconductive. This will effectively disconnect the batteries 10 and 12 and the loads 14 and 16 to prevent further discharge of the batteries and thereby protect the batteries from over discharge.

When it is desired to charge the batteries 10 and 12 with the system of FIG. 1 the switches 24 and 34 can be opened to disconnect the electrical loads from the batteries. Charging current is now supplied to the batteries 10 and 12 in series from direct current source 38 through diode 44 and conductor 54. As the batteries are charged the terminal voltage of the batteries increases and at some point in time the voltage between junction 41 and conductor 54 will increase to such a value as to cause the transistor 56 to become biased conductive. In this regard it will be appreciated that as the voltage between junction 41 and conductor 54 increases the amount of voltage between the tap 60 and junction 64 across the lower portion of resistor 62 will increase. In this charging mode of operation the Zener diode 68 remains conductive and as the voltage increases between junction 41 and conductor 54 the voltage also increases across the lower part of resistor 62 and at some predetermined voltage transistor 56 is biased conductive. When transistor 56 becomes biased conductive it connects resistor 58 across the batteries 10 and 12 and across the source of charging current 38 through the base-emitter circuit of transistor 32. This shunts charging current away from the batteries 10 and 12 to thereby prevent these batteries from being over charged. The diode 46 is utilized to energize the over charge protection circuit of FIG. 1 when switches 24 and 34 are open.

Figure 2:
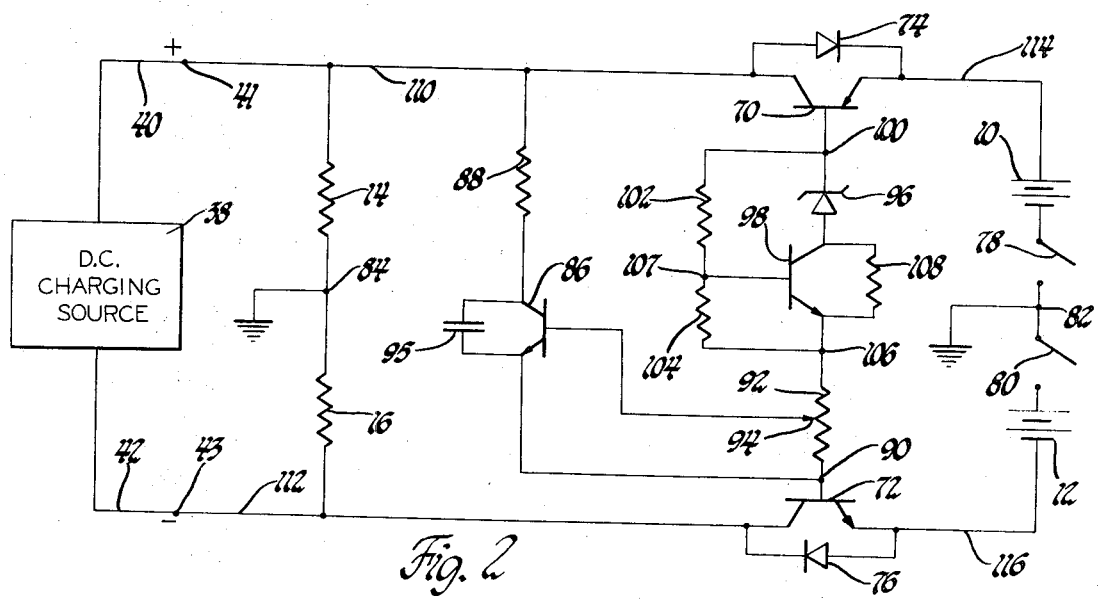
FIG. 2 is a schematic circuit diagram of a modification of FIG. 1 where the batteries to be charged and discharged have a higher voltage than those utilized in FIG. 1.

Referring now to FIG. 2, a modified battery charge and discharge protection circuit is illustrated. In the FIG. 2 embodiment the same reference numerals have been used as were used in FIG. 1 to identify the same components in each embodiment. In the FIG. 2 embodiment the electrical loads 14 and 16 are connected across the terminals 41 and 43 of the source of charging current 38 while the batteries 10 and 12 are connected to the electrical loads through the emitter-collector circuit of a PNP transistor 70 and the collector-emitter circuit of an NPN transistor 72. In FIG. 2 a diode 74 is connected across the collector and emitter of transistor 70 and a diode 76 is connected across emitter and collector of transistor 72. A pair of manually operable switches 78 and 80, which can be ganged together for operation, are connected between the batteries and a grounded junction 82. The electrical loads 14 and 16 are connected to the grounded junction 84.

In FIG. 2 an NPN transistor 86 is provided which performs the same function as transistor 56 in FIG. 1. This collector-emitter circuit of this transistor is connected in series with a resistor 88. The emitter of transistor 86 is connected to a junction 90. The junction 90 is connected with the base of transistor 72 and to one side of adjustable resistor 92. The adjustable tap 94 of this resistor is connected with the base of transistor 86 and a capacitor 95 is connected across the collector and emitter of transistor 86.

The FIG. 2 embodiment has a modified control circuit connected between one end of resistor 92 and the base of transistor 70 as will be apparent from a comparison of FIGS. 1 and 2. The control circuit in FIG. 2 includes a voltage responsive device which takes the form of a Zener diode 96 connected between the collector of an NPN transistor 98 and junction 100. A pair of resistors 102 and 104 are connected in series between junctions 100 and 106. The junction 107 of these two resistors is connected to the base of transistor 98. A resistor 108 is connected across the collector and emitter of transistor 98.

The input conductors for supplying charging current to the batteries are designated by reference numerals 110 and 112 and these are connected with the terminals 41 and 43 and therefore to the direct current charging source 38.

The operation of the system illustrated in FIG. 2 will now be described. When switches 78 and 80 are closed the batteries 10 and 12 can supply current to the loads 14 and 16 providing that transistors 70 and 72 are biased conductive. When the terminal voltage of these batteries exceeds a predetermined value the Zener diode 96 will break down providing a current path for current through the emitter-base junction of transistor 70 and the base-emitter junction of transistor 72 to therefore cause transistors 70 and 72 to be biased conductive.

Should the terminal voltage of the batteries 10 and 12 drop below a predetermined value, for example 88 volts where the batteries 10 and 12 in FIG. 2 are 52 volt batteries, the Zener diode 96 will block current flow through the base circuits of transistors 70 and 72 with the result that these transistors become biased nonconductive to disconnect the batteries 10 and 12 and the electrical loads 14 and 16.

The control circuit connected between the base electrodes of transistors 70 and 72 is used where the batteries have a higher voltage for example 52 volt batteries instead of the 12 volt batteries of FIG. 1 and is used where the voltage values at which charging or discharging of the batteries is terminated requires a change in voltage in excess of 5 or 6 volts. The control circuit connected between the base electrodes of transistors 70 and 72 reduces current drain on the batteries when the batteries are feeding the electrical loads but still provides a circuit which will terminate discharging of the batteries when the terminal voltage of the batteries drops to a predetermined value and limit charging of the batteries when the terminal voltage of the batteries rises above a predetermined value. Where the batteries 10 and 12, in FIG. 2, are 52 volt batteries the resistor 102 has a relatively high resistance of, for example, 4.7 megohms while the resistance of resistor 104 is approximately 82,000 ohms. The resistance of variable resistor 92 can be 500 ohms and the resistance of resistor 108 can be approximately 10,000 ohms. With such an arrangement and assuming that the discharge of the batteries is to be terminated at approximately 88 volts across the batteries 10 and 12 the Zener diode 96 will have an 85 volt break down voltage.

In operation, the circuit connected between the bases of transistors 70 and 72 will prevent a large discharge current through this circuit when the batteries are supplying the electrical load but will nevertheless properly vary the voltage between the tap 94 and junction 90 to control the conduction of transistor 86. It will be appreciated by those skilled in the art that as the voltage between conductors 114 and 116 increase the voltage between the collector of transistor 98 and the base of transistor 72 will increase as will the current through resistor 92. This is due both to the change in voltage and change in conductance of transistor 98. By way of example, the voltage between the collector of transistor 98 and the base of transistor 72 may have voltage values of 1.75 volts, 11.5 volts and 21 volts where the voltage across conductors 114 and 116 is respectively, 88 volts, 98 volts and 108 volts. For the just mentioned input voltages the current through resistor 92 will be respectively 1.16 ma., 2.4 ma. and 3.7 ma.

The circuit of FIG. 2 will bias the transistors 70 and 72 nonconductive when the voltage between conductors 114 and 116 drops below 88 volts and will bias transistor 86 conductive when the voltage across conductors 114 and 116 reaches 108 volts where batteries 10 and 12 are 52 volt batteries. In this regard the adjustable resistor 92 is adjusted such that at the higher voltage (108 volts) the current through the resistor 92 is of such a value as to provide sufficient voltage to bias transistor 86 conductive.

It will be appreciated from the foregoing that the circuit connecting the base electrodes of transistors 70 and 72 reduces current consumption but still provides a circuit that will properly respond to changes in voltage across conductors 114 and 116.

When the direct current source 38 is charging the batteries 10 and 12 the battery charging current will bypass transistors 70 and 72 and will flow through diodes 74 and 76. The terminal voltage of the batteries will increase as the batteries continue to be charged and when the voltage appearing between conductors 114 and 116 exceeds a predetermined value the voltage drop across the lower end of resistor 92 between tap 94 and junction 90 will be sufficient to forward bias transistor 86 and therefore shunt charging current away from the batteries 10 and 12.

Figure 3:
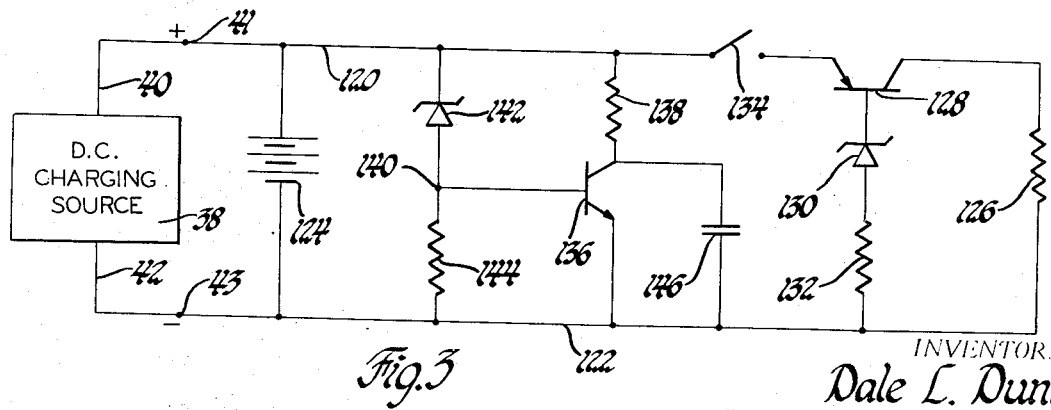
FIG. 3 is a schematic circuit diagram of a battery protection system for use with a single battery and a single electrical load made in accordance with this invention.

Referring now more particularly to FIG. 3, a battery charge and discharge control circuit is illustrated for controlling a system which has one battery and one electrical load. In the system of FIG. 3 the terminals 41 and 43 of the direct current charging source 38 are connected with conductors 120 and 122. The battery is designated by reference numeral 124 and it is connected across conductors 120 and 122. The electrical load in the FIG. 3 embodiment is designated by reference numeral 126 and one side of this load is connected with conductor 122. The opposite side of load 126 is connected with the collector of a PNP transistor 128. The base of transistor 128 is connected with a Zener diode 130 and the opposite side of this Zener diode is connected with conductor 122 through resistor 132. The emitter of transistor 128 is connected to one side of a manually operable switch 134 the opposite side of this switch being connected with conductor 120.

The over charge limiter in FIG. 3 includes NPN transistor 136 having its emitter connected to conductor 122 and its collector connected to conductor 120 through a resistor 138. The base of transistor 136 is connected with junction 140 and a Zener diode 142 is connected between conductor 120 and junction 140. A resistor 144 is connected between junction 140 and conductor 122 and a capacitor 146 is connected across the collector and emitter of transistor 136.

In the system of FIG. 3 the battery 124 will supply the electrical load 126 whenever switch 134 is closed and providing that transistor 128 is conductive in its emitter-collector circuit.

The break down voltage of Zener diode 130 is selected such that as long as the terminal voltage of battery 124 is above a predetermined value the Zener diode 130 will be conductive to cause transistor 128 to be biased conductive. When the terminal voltage of battery 124 drops to some predetermined value the Zener diode 130 will switch to a blocking state to therefore cause the transistor 128 to be biased nonconductive. This will prevent further discharge of the battery since transistor 128 now disconnects the battery 124 and the load 126.

When the source of direct current 38 is charging battery 124 the voltage across conductors 120 and 122 will increase as the battery is charged. When this voltage reaches a predetermined limiting value the Zener diode 142 will break down causing current to flow through resistor 144. The voltage developed across resistor 144 will now forward bias the base-emitter circuit of transistor 136 causing transistor 136 to be biased conductive. This will connect resistor 138 across the source of charging current and battery to shunt current away from the battery 124 to thereby limit the charging current supplied to the battery.

The resistor 138, in the FIG. 3 embodiment, can be approximately a 20 ohm 3 watt resistor where the highest expected output of the source of direct current 38 is approximately 700 milliamps and where the battery 124 is a 12 volt battery. Where the battery 124 is a 12 volt battery the Zener diode 142 may have a break down voltage of approximately 12.6 volts while the break down voltage of Zener diode 130 can be approximately 10 volts.

It will of course be appreciated that values of resistors and values of break down voltages of the Zener diodes and values of other circuit components will vary in accordance with the terminal voltage of the batteries being utilized and will be tailored to the source of charging current.

What is claimed is:

1. An electrical control system for controlling the charging and discharging of a storage battery comprising, a source of direct charging current, a storage battery, an electrical load, a circuit for energizing said electrical load from said storage battery including a first transistor having its emitter-collector circuit connected in series between said battery and said electrical load, a voltage responsive control means connected with said battery and with the emitter-base circuit of said first transistor, said voltage responsive control means operative to bias said first transistor conductive in its emitter-collector circuit when the terminal voltage of said battery exceeds a predetermined value and operative to cause said first transistor to be biased nonconductive to disconnect said battery and electrical load when the terminal voltage of said battery drops below a predetermined value, a second transistor having an emitter, collector and base, a resistor, means connecting said resistor and the collector and emitter of said second transistor in series across said source of charging current and across said battery whereby said second transistor and resistor shunt charging current away from said battery when said second transistor is biased conductive, and voltage responsive control means connected with said battery and source of charging current and with the base and emitter of said second transistor, said voltage responsive control means operative to bias said second transistor conductive when the voltage across said battery exceeds a predetermined value, said voltage responsive means operating to bias said second transistor nonconductive when the voltage across said battery is below a predetermined value but higher than the voltage that biases said first transistor nonconductive.

2. An electrical control system for controlling the discharging of a plurality of storage batteries feeding a plurality of electrical loads comprising, first and second series connected batteries having a common junction, first and second series connected electrical loads having a common junction, means electrically connecting the common junctions of said batteries and electrical loads, first and second transistors, means connecting the emitter and collector of said first transistor in series between one of said batteries and one of said electrical loads, means connecting the collector and emitter and said second transistor in series between said other electrical load and said other battery, a circuit connecting the base electrodes of said first and second transistors including a Zener diode, said Zener diode having a breakdown voltage which is of such a value that said first and second transistors are biased conductive when the terminal voltage of said batteries is above a predetermined value, the bias circuit for biasing said transistors conductive including the emitter-base and base-emitter junctions of said first and second transistors and said Zener diode, said Zener diode operative to block base current for said first and second transistors when the terminal voltage of said batteries drops below a predetermined value to thereby bias said transistors nonconductive and electrically disconnect said batteries and said electrical loads.

3. A control system for controlling the charging and discharging of a plurality of batteries which feed a plurality of electrical loads comprising, a source of direct charging current, first and second power supply conductors connected with said source of charging current, first and second series connected batteries connected across said power supply conductors having a common junction, first and second electrical loads having a common junction, means electrically connecting the common junctions of said batteries and electrical loads, a first PNP transistor connected between one of said power supply conductors and one end of one of said electrical loads, a second NPN transistor connected between the other of said electrical loads and said second power supply conductor, a circuit connected between the base electrodes of said first and second transistors including in a series connection a Zener diode and a first resistor, a third transistor having an emitter, collector and base, a second resistor, means connecting said second resistor and the collector and emitter of said third transistor between said first power supply conductor and the base of said second transistor, and means connecting the emitter and base of said third transistor across at least a portion of said first resistor, said Zener diode operating to bias said first and second transistors substantially nonconductive to disconect said batteries from said electrical loads when the terminal voltage of said batteries drops below a predetermined value and operative to bias said first and second transistors conductive when the terminal voltage of said batteries is above a predetermined value, the voltage developed across said first resistor operating to bias said third transistor conductive to shunt charging current away from said battery whenever the voltage across the terminals of said battery exceeds a predetermined value.

4. An electrical control system for controlling the charging and discharging of a plurality of batteries which feed a plurality of electrical loads comprising, a source of direct charging current, first and second power supply conductors connected with said source of charging current, first and second electrical loads having a common junction connected across said power supply conductors, first and second batteries having a common junction connected with the common junction of said electrical loads, a first transistor of the PNP type having its collector and emitter connected between said first power supply conductor and one end of said first battery, a second transistor of the NPN type having its collector and emitter connected between said second power supply conductor and one end of said second battery, first and second diodes connected respectively across the emitter and collector electrodes of said first and second transistors providing a path for charging current for charging said batteries from said source of charging current, a control circuit connecting the base electrodes of said first and second transistors including a Zener diode and a first resistor, a third transistor having a collector, emitter and base, a second resistor, means connecting said second resistor and the collector and emitter of said third transistor in series between said first power supply conductor and the base of said second transistor, means connecting the base of said third transistor with said first resistor whereby the base and emitter of said third transistor are connected across at least a portion of said first resistor, said Zener diode operating to control the conduction of said first and second transistors and operating to cause said first and second transistors to be biased nonconductive when the terminal voltage of said batteries is below a predetermined value to thereby disconnect said batteries and electrical load, the voltage developed across said first resistor operating to bias said third transistor conductive when the terminal voltage of said battery exceeds a predetermined value to thereby shunt charging current away from said batteries.

5. The electrical control system according to claim 4 where the control circuit includes a fourth transistor having its collector and emitter connected in series between the Zener diode and said first resistor and where a voltage divider is connected between the base of said first transistor and said first resistor and further where the voltage divider is comprised of resistors having a junction connected with the base of the fourth transistor.

6. An electrical control system for controlling the charging and discharging of a battery comprising, a source of direct charging current, a battery, an electrical load, a first transistor having an emitter, collector and base, means connecting the emitter and collector of said first transistor in series between said battery and electrical load whereby said transistor controls the energization of said electrical load from said battery, a Zener diode, means connecting the emitter and base of said first transistor and said Zener diode across said battery whereby said first transistor is biased conductive when the terminal voltage of said battery exceeds a predetermined value and is biased nonconductive to disconnect said battery and electrical load when the terminal voltage of said battery is below a predetermined value, a second transistor having an emitter, base and collector, a resistor, means connecting said resistor and the collector and emitter of said second transistor across said battery and across said source of charging current whereby said resistor and second transistor form a circuit for shunting charging current away from said battery when said second transistor is conductive, a second Zener diode and a second resistor connected in series across said battery having a junction connected with the base of said second transistor, said second Zener diode and second resistor operating to bias said second transistor conductive when the terminal voltage of said battery exceeds a predetermined value to thereby limit charging current to said battery, said second Zener diode and second resistor biasing said second transistor substantially nonconductive when the terminal voltage of said battery is below a predetermined value.

References Cited

UNITED STATES PATENTS

| | | | |
|---|---|---|---|
| 3,069,617 | 12/1962 | Mohler | 323—22 |
| 3,217,237 | 11/1965 | Giger | 323—22 |
| 3,453,518 | 7/1969 | Rose et al. | 320—5 |

ROBERT K. SCHAEFER, Primary Examiner

H. J. HOHAUSER, Assistant Examiner

U.S. Cl. X.R.

320—39